(12) United States Patent
Jann et al.

(10) Patent No.: US 8,201,029 B2
(45) Date of Patent: Jun. 12, 2012

(54) METHOD AND APPARATUS FOR OPERATING SYSTEM EVENT NOTIFICATION MECHANISM USING FILE SYSTEM INTERFACE

(75) Inventors: Joefon Jann, Ossining, NY (US); Pratap Pattnaik, Ossining, NY (US); Ramanjaneya Sarma Burugula, Yorktown Heights, NY (US); Niteesh Dubey, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/023,185

(22) Filed: Jan. 31, 2008

(65) Prior Publication Data
US 2009/0199051 A1  Aug. 6, 2009

(51) Int. Cl.
*G06F 11/00* (2006.01)
(52) U.S. Cl. .......... 714/48; 714/47.1; 714/51; 707/705; 711/170
(58) Field of Classification Search .............. 714/48, 714/47.1, 51; 707/705; 711/170
See application file for complete search history.

(56) References Cited

U.S. PATENT DOCUMENTS

| | | | | |
|---|---|---|---|---|
| 4,713,656 A * | 12/1987 | Cliff et al. | | 345/168 |
| 5,805,886 A | 9/1998 | Skarbo et al. | | |
| 5,828,882 A | 10/1998 | Hinckley | | |
| 6,199,179 B1 | 3/2001 | Kauffman et al. | | |
| 6,216,132 B1 * | 4/2001 | Chandra et al. | | 1/1 |
| 6,263,290 B1 * | 7/2001 | Williams et al. | | 702/71 |
| 6,266,716 B1 * | 7/2001 | Wilson et al. | | 710/33 |
| 6,505,245 B1 | 1/2003 | North et al. | | |
| 6,529,842 B1 * | 3/2003 | Williams et al. | | 702/66 |
| 6,549,916 B1 * | 4/2003 | Sedlar | | 1/1 |
| 6,718,482 B2 * | 4/2004 | Sato et al. | | 714/4.4 |
| 6,728,715 B1 * | 4/2004 | Astley et al. | | 707/737 |
| 6,754,664 B1 * | 6/2004 | Bush | | 1/1 |
| 6,829,639 B1 * | 12/2004 | Lawson et al. | | 709/224 |
| 6,910,070 B1 * | 6/2005 | Mishra et al. | | 709/224 |
| 6,910,160 B2 | 6/2005 | Bajoria et al. | | |
| 6,965,917 B1 * | 11/2005 | Aloni et al. | | 709/206 |
| 7,107,497 B2 * | 9/2006 | McGuire et al. | | 714/48 |
| 7,117,388 B2 | 10/2006 | Arimilli et al. | | |
| 7,260,752 B2 * | 8/2007 | Linam et al. | | 714/48 |
| 7,472,067 B2 * | 12/2008 | Mathur et al. | | 704/270 |
| 7,539,986 B2 | 5/2009 | Grobman | | |

(Continued)

FOREIGN PATENT DOCUMENTS

EP          1 970 807 A1      9/2008

OTHER PUBLICATIONS

Greg Shultz, Disable Windows XP's Error Reporting notification, Aug. 29, 2007, http://www.techrepublic.com/blog/window-on-windows/disable-windows-xps-error-reporting-notification/507.*

(Continued)

*Primary Examiner* — Scott Baderman
*Assistant Examiner* — Loan L. T. Truong
(74) *Attorney, Agent, or Firm* — McGinn IP Law Group, PLLC

(57) ABSTRACT

A method and structure for notifying operating system events, includes standard filesystem interfaces provided for event consumers to use for one or more of registering for event notifications of a set of events, receiving an event notification when each event occurs, and getting details of events that have occurred.

17 Claims, 10 Drawing Sheets

U.S. PATENT DOCUMENTS

| | | | |
|---|---|---|---|
| 7,558,986 B2* | 7/2009 | Abe | 714/38 |
| 7,730,359 B2* | 6/2010 | Clarke | 714/43 |
| 7,734,945 B1 | 6/2010 | Levidow et al. | |
| 7,831,960 B2* | 11/2010 | Vazquez et al. | 717/121 |
| 7,996,353 B2* | 8/2011 | Chan et al. | 706/48 |
| 8,104,080 B2* | 1/2012 | Burns et al. | 726/14 |
| 2002/0035649 A1* | 3/2002 | Korn et al. | 709/318 |
| 2002/0059380 A1* | 5/2002 | Biliris et al. | 709/206 |
| 2002/0089526 A1* | 7/2002 | Buxton et al. | 345/700 |
| 2002/0120884 A1* | 8/2002 | Nakamikawa et al. | 714/31 |
| 2002/0124165 A1 | 9/2002 | Smith et al. | |
| 2002/0124215 A1 | 9/2002 | Austen et al. | |
| 2002/0129110 A1* | 9/2002 | Liu et al. | 709/206 |
| 2003/0070114 A1* | 4/2003 | Yasuda | 714/20 |
| 2003/0074601 A1* | 4/2003 | Schultz et al. | 714/15 |
| 2003/0126202 A1 | 7/2003 | Watt | |
| 2003/0131039 A1 | 7/2003 | Bajoria et al. | |
| 2003/0204780 A1 | 10/2003 | Dawkins et al. | |
| 2004/0119736 A1* | 6/2004 | Chen et al. | 345/736 |
| 2004/0153834 A1* | 8/2004 | Oshima et al. | 714/38 |
| 2005/0081212 A1 | 4/2005 | Goud et al. | |
| 2005/0086491 A1* | 4/2005 | Haugh et al. | 713/182 |
| 2005/0091354 A1 | 4/2005 | Lowell et al. | |
| 2005/0172279 A1* | 8/2005 | Cook et al. | 717/162 |
| 2005/0204199 A1 | 9/2005 | Harper et al. | |
| 2005/0235007 A1 | 10/2005 | Abali et al. | |
| 2006/0005085 A1* | 1/2006 | Zunino et al. | 714/47 |
| 2006/0075171 A1* | 4/2006 | Wei | 710/260 |
| 2006/0085792 A1 | 4/2006 | Traut | |
| 2006/0136720 A1 | 6/2006 | Armstrong et al. | |
| 2006/0265508 A1* | 11/2006 | Angel et al. | 709/230 |
| 2006/0282637 A1* | 12/2006 | Yamauchi et al. | 711/170 |
| 2007/0033273 A1* | 2/2007 | White et al. | 709/223 |
| 2007/0073751 A1* | 3/2007 | Morris et al. | 707/101 |
| 2007/0128899 A1 | 6/2007 | Mayer | |
| 2008/0115012 A1 | 5/2008 | Jann et al. | |
| 2008/0126780 A1 | 5/2008 | Rajkumari et al. | |
| 2008/0235503 A1* | 9/2008 | Akpuokwe et al. | 713/1 |
| 2009/0113452 A1* | 4/2009 | Grigsby et al. | 719/318 |
| 2009/0138808 A1* | 5/2009 | Moromisato et al. | 715/758 |
| 2009/0172471 A1 | 7/2009 | Zimmer et al. | |
| 2009/0182778 A1* | 7/2009 | Tormasov | 707/200 |

OTHER PUBLICATIONS

Irving, "Partitioning Implementation for IBM @server p5 Servers" Feb. 2005, IBM, third edition, pp. 1-342.

Quintero, "HACMP V5.3, Dynamic LPAR, and Virtualization", 2005, IBM Red Books, pp. 1-60.

Wikipedia, "Concurrent computing" Wikipedia, p. 1-5.

Wikipedia, "Concurrent multitasking" Wikipedia, p. 1-5.

Cartwright, "What is Concurrent Programming", Jan. 2000, www.cs.rice.edu, p. 1-5.

Office Action dated Aug. 30, 2010 for U.S. Appl. No. 11/599,272.

Office Action mailed on Jun. 6, 2011, for co-pending U.S. Appl. No. 12/537,486.

International Search Report dated Nov. 3, 2011.

Huang, "A case for High Performance computing with Virtual Machines", 2006, ACM, p. 1-10.

Thefreedictionary, "Virtualization Definition" Thefreedictionary, p. 1.

* cited by examiner

Figure 4: Mounting the AHAFS Filesystem

METHOD AND APPARATUS FOR OPERATING SYSTEM EVENT NOTIFICATION MECHANISM USING FILE SYSTEM INTERFACE

BACKGROUND OF THE INVENTION

1. Field of the Invention

The present invention generally relates to a system for monitoring an operating system. More specifically, a monitor mechanism based on a pseudo filesystem, using standard filesystem interfaces and a file tree representation, takes event requests from event consumers and forwards them to the producers, receives event occurrence information from the event producers, and notifies the event consumers of this information, eliminating the need for periodic polling and specialized monitoring APIs.

2. Description of the Related Art

System administrators in large data centers typically monitor the health of an operating system (OS) running on a computer server with centralized monitoring applications. Such a centralized monitoring application typically has an agent that runs in each OS instance and typically does periodic polling to collect OS-health related data. This data is then analyzed by either the central application, or by the agent in the monitored OS itself, which typically relays the information to the central application. Whenever bad health in a monitored-OS is detected, the central monitoring application generates an event to the system administrator. In the simple case, this event can cause a notification (e.g. email) to be sent to the administrator, or in a more sophisticated case, a corrective action can be taken (e.g. the execution of a specified program).

There are two major problems with the periodic polling approach of existing OS-health monitoring applications:

1. Since OS data changes dynamically and rapidly, the freshness or accuracy of the data collected, and the ability to take action based on this time-sensitive data, are dependent on the length of the polling period. If the period (time between two consecutive polls) is too long, then the OS may have gone into an "unhealthy" state after a poll and before its subsequent poll, so that the problem cannot be detected, and hence corrective actions cannot be taken in time.

2. The polling activity adds overhead to the OS. The more polling users there are in the OS instance, the more the overhead.

To address the above problems, several non-polling event notification methods have been proposed in the past, each requiring the application to use a specialized monitoring API (Application Programming Interface) to register its interest in being notified of an event and to get more details on an event after the event has occurred.

The problem with specialized monitoring APIs are that language bindings have to be developed and maintained for most of the predominant languages used for system management applications, and there are many of these languages, e.g., Perl, C, C++, Java, Python, etc. The complexity of having to maintain a specialized API over multiple versions of the OS, and over multiple languages in an OS version, and over multiple versions of each language that are supported within one OS version, often deters the use of these specialized APIs by existing systems management tools.

Thus, in view of these problems with polling and specialized APIs, a need exists for a more efficient method of monitoring the health of operating systems, preferably using a method that does not require polling and does not use specialized APIs.

SUMMARY OF THE INVENTION

In view of the foregoing, and other, exemplary problems, drawbacks, and disadvantages of the conventional systems, it is an exemplary feature of the present invention to provide a method (and structure) for monitoring the health of an operating system without using periodic polling.

It is another exemplary feature of the present invention to provide OS monitoring without using a specialized monitoring API.

Therefore, an exemplary objective of this invention is to provide an event notification mechanism that is efficient and flexible and does not require polling.

Another exemplary objective of the invention is to provide an event notification mechanism that can be used by a wide variety of applications, using standard filesystem APIs, and without introducing a new and additional set of specialized APIs.

To achieve the above exemplary features and objectives, in a first exemplary aspect of the present invention, described herein is an apparatus including a central processing unit (CPU); and a memory including instructions for an event notification mechanism in an operating system (OS) being executed by the CPU, the OS event notification mechanism including a standard filesystem interfaces for event consumers to use for one or more of: registering for an event notification; receiving an event notification when each event occurs; and getting details of an event that has occurred.

In a second exemplary aspect of the present invention, also described herein is a method of notifying operating system events, including providing standard filesystem interfaces for event consumers to use for one or more of: registering for an event notification; receiving an event notification when each event occurs; and getting details of an event that has occurred.

In a third exemplary aspect of the present invention, also described herein is a machine-readable medium tangibly embodying a program of machine-readable instructions executable by a digital processing apparatus to perform the above-described method of notifying operating system events.

In a fourth exemplary aspect of the present invention, also described herein is a network including a first computer operating an operating system including a method of notifying operating system events by the above-described method and a second computer receiving the event notifications.

In a fifth exemplary aspect of the present invention, also described herein is a service including at least one of monitoring a health of an operating system of a computer, debugging a problem of said computer, and developing software solutions for the operating system or a program executed by the operating system, wherein the monitoring, debugging, or developing includes receiving event notifications of said operating system using the notification mechanism based on the above-described method.

As will be clearer from the following description, the present invention provides a number of advantages, including that of providing far more useful information than existing software and being directly usable by any monitoring software that supports fileSystem interfaces, (e.g., open( ), write( ), select( ), read( ), close( ), . . . ). It also more effectively monitors time-critical events so that prompt response-actions can be taken before the system is doomed.

The present invention also achieves low overhead by using select( ) call notification, instead of periodic polling by all the users, as well as providing flexibility because multiple consumers can monitor the same event, each with a different threshold value, without linearly increasing the overhead on the OS. Moreover, multiple applications can benefit from the present invention, including the integration into debugging tools to provide more sophisticated debugging capabilities to software developers.

BRIEF DESCRIPTION OF THE DRAWINGS

The foregoing and other exemplary purposes, aspects and advantages will be better understood from the following detailed description of an exemplary embodiment of the invention with reference to the drawings, in which.

EXEMPLARY EMBODIMENTS OF THE INVENTION

Figure 1:
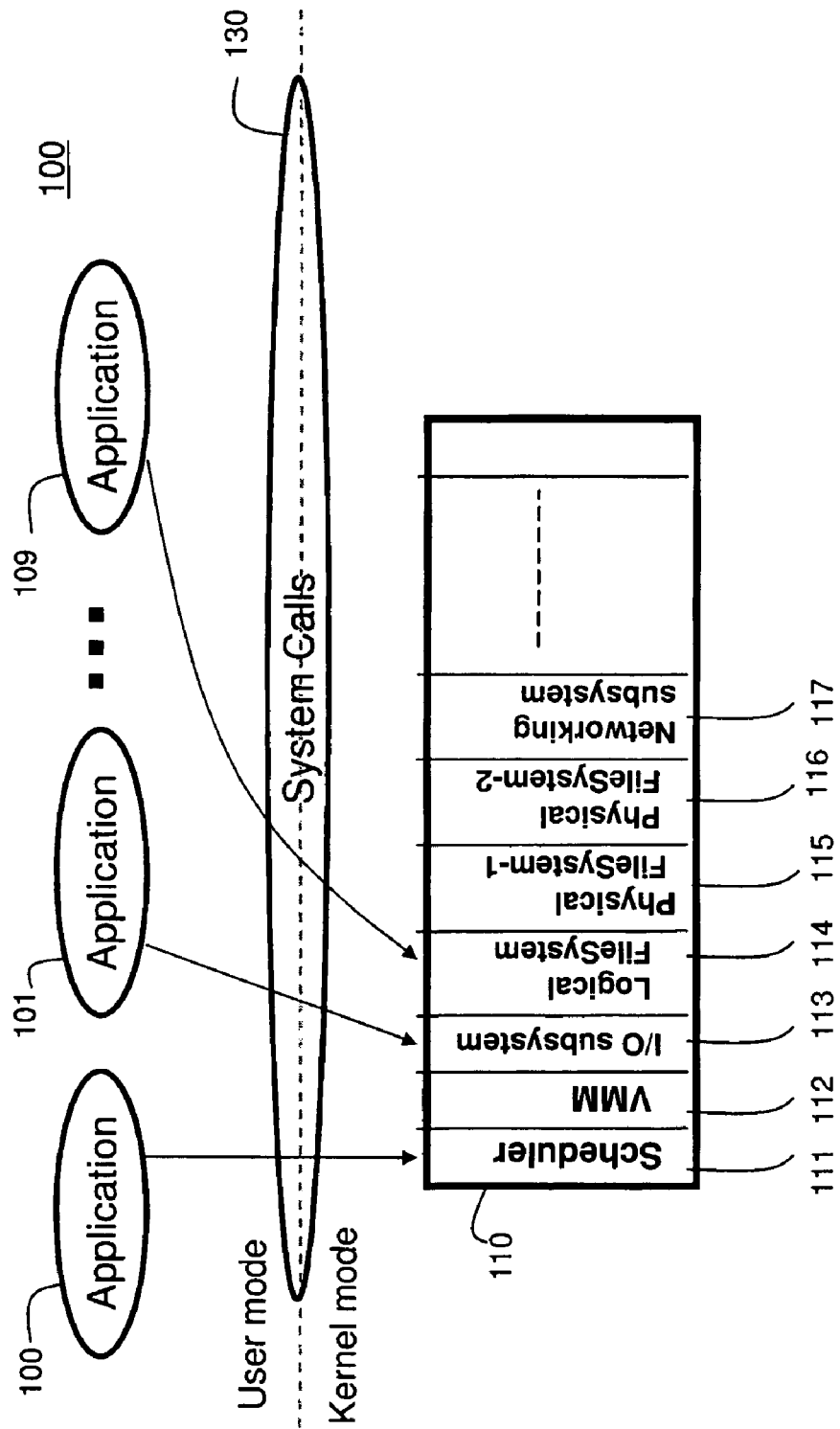
FIG. 1 provides an exemplary schematic 100 of various components of a typical operating system in which the current invention is applicable.

Referring now to the drawings, and more particularly to FIGS. 1-10, exemplary embodiments of the method and structures according to the present invention will now be described.

As mentioned above, this disclosure describes a novel efficient and flexible mechanism and infrastructure to monitor OS events and to notify users asynchronously upon occurrences of their registered events, without requiring polling, and without requiring the need to create a new specialized API. This mechanism is intended to be used in monitoring applications that are written in any of the current predominant system management languages, such as Perl, PHP, Python, Java, C, C++, etc.

To eliminate the problems associated with periodic polling and those associated with developing a new specialized API, the present invention describes a novel, efficient, and flexible mechanism and infrastructure to monitor OS events and to notify users asynchronously upon occurrences of their registered events, without requiring polling, and without requiring the need to create a new specialized API. This mechanism can be used in monitoring applications that are written in any of the predominant monitoring languages, as listed above.

Specifically, the mechanism of the present invention is exemplarily based on the ubiquitous and standard filesystem APIs (e.g., open( ), write( ), select( ), read( ), close( ), etc.) that are used for accessing files and filesystems.

It is noted that the standard file system interfaces are well defined and well-known. For example, they are part of the POSIX.1 specification (POSIX stands for Portable Operating Systems Interface) developed by the Open Group consortium whose members include IBM, HP and SUN. This specification is also known as IEEE standard 1003.1, although it is noted that this standard covers a lot more Operating System services than just file system related services. One can see this standard at the "single_unix_specification" website.

However, it is also noted that the present invention is not intended as confined to this one operating system specification or the exemplary embodiments described herein. Rather, it is intended that the terminology "standard filesystem interface" refers to filesystem interfaces that are commonly available in the operating system environment of interest without resorting to specialized interfaces developed specifically for the purpose of OS monitoring.

In more details, this invention includes a FileSystem (FS), which is herein referred to as the /aha filesystem (AHAFS for short), to be used by monitoring applications. AHAFS is an acronym for Autonomic Health Advisor FileSystem.

Figure 2:
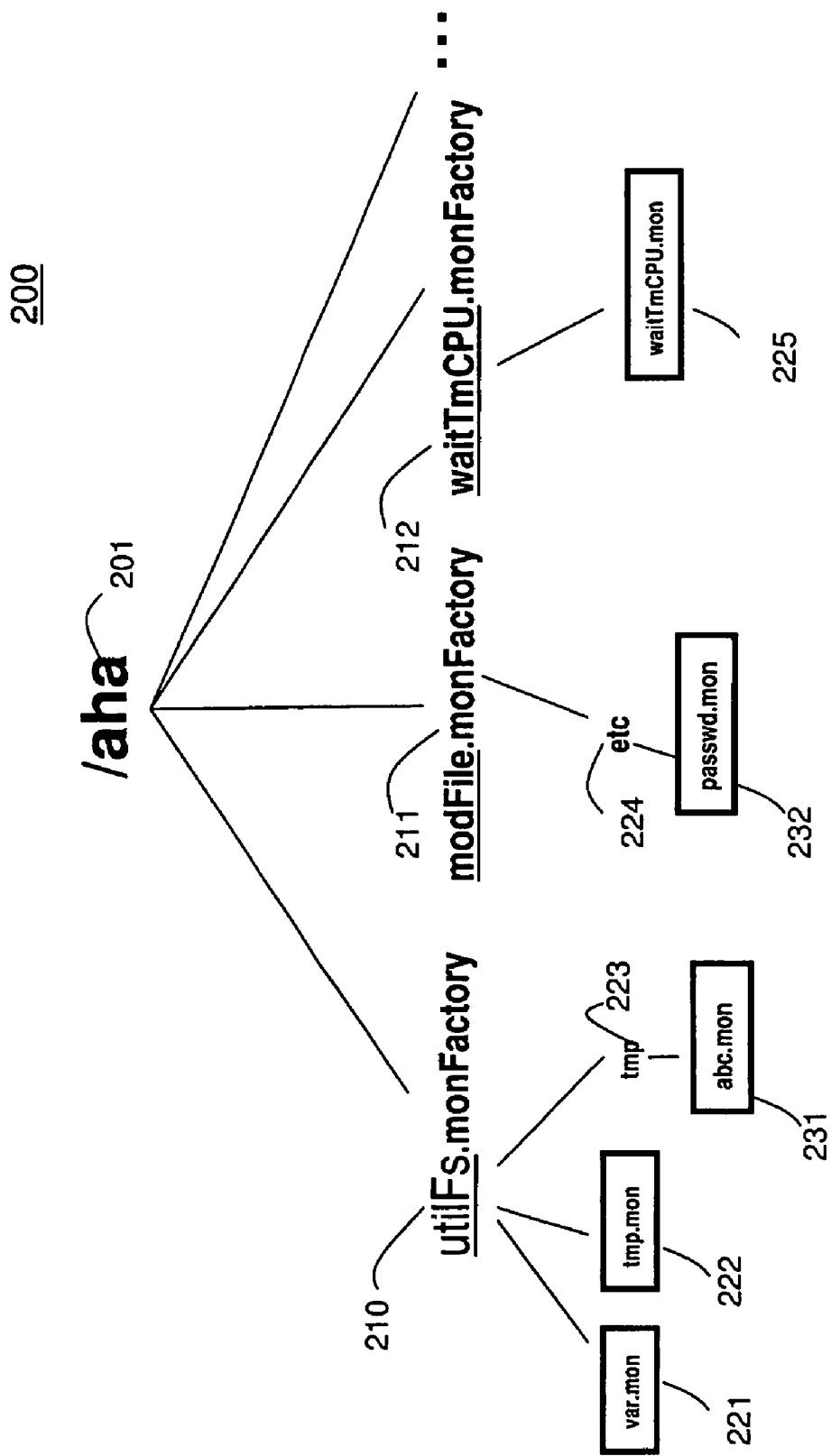
FIG. 2 lists the major components of the event management filesystem 200 in one exemplary embodiment of the present invention.

This filesystem will present various system event-producers in the Operating System (OS) as special directories, referred to herein as "monitor factory directories", under the root directory /aha (e.g., see FIG. 2). The individual event instances served by the event producers are presented as leaf-level file nodes referred to herein as "monitor nodes." Each monitor node will be under one and only one monitor factory node.

The following sequence of actions describes how the event notification exemplarily occurs at a high level:

1. A monitoring application registers to be notified of an event by first creating and opening the monitor file associated with that event. It is noted that there is no need to create it if the desired monitor file already exists.

2. The monitoring application then writes into that file some event-producer-specific input information to indicate when the event should be triggered.

3. The monitoring application then calls selects to wait for the event to occur.

4. AHAFS forwards the monitoring application's event request to the event producer.

5. When the event occurs, the event producer informs AHAFS about the event details.

6. AHAFS wakes up the monitoring application or applications that are waiting in a select( ) call.

7. The monitoring application then reads from the monitor file to get the event details.

8. The monitoring application closes the file when it no longer wants to be notified any more.

The above steps and an exemplary applicable environment are described in more details below.

Major components in an exemplary typical operating system (OS) are depicted in the schematic 100 of FIG. 1. An OS instance typically contains several applications 100 . . . 109 executing in user mode. The kernel 110 comprises the core of the OS. The kernel itself consists of multiple subcomponents such as a process and thread Scheduler 111, a Virtual Memory Manager (VMM) 112, an I/O subsystem 113, a Logical Filesystem (LFS) layer 114, multiple Physical Filesystems (PFS) 115,116, a Networking subsystem 117, and so on. The applications 101 ... 109 access the services provided by the kernel via a set of interfaces called system calls 130.

These system calls will change the privilege level of the applications from user mode (lower privilege level) to kernel mode (higher privilege level) when they execute the services provided by the kernel. The FS system calls are a set of system calls that are provided by the LFS layer 114. Examples of FS system calls are open( ), close( ), read( ), write( ), select( ), seek( ), etc. It is noted that these FS system calls are well known in the art.

In the present invention, when an application issues a FS system call on a file, the LFS layer will identify the Physical Filesystem (PFS) corresponding to that file and invokes operations on that PFS. The operations are provided by the called virtual node (vnode) operations and Virtual FileSystem (VFS) operations.

It is noted that the terms "vnode operations" and "vfs operations" are part of the standard file system terminology in the Unix operating systems. The term "virtual", in this context, implies that there is a level of indirection between the applications accessing the physical file system and the kernel/kernel extensions that provide the physical file system. The present invention, as implemented on Unix and like any other file system, will also be accessed via the vnode and vfs operations. The present invention (AHAFS) appears to the operating system as a PFS and presents itself as a file tree to the monitoring applications, as illustrated in FIG. 2.

FIG. 2 shows how the AHAFS framework appears to the end users and to the monitoring applications. In this exemplary embodiment 200, this technology is represented by a file tree starting with the root node /aha 201. Under the root directory there are several subdirectories 210, 211, 212, ..., which are referred to herein as "Monitor Factory" nodes or subdirectories, each of which represents one event producer.

This exemplary implementation is flexible and enables enhanced organization or house-keeping by allowing several intermediate subdirectories to be created between the /aha directory and the monitor factory nodes. Underneath each monitor factory node there can be one or more monitor nodes. Each monitor node represents a unique event that can be monitored by the event producer, which can send notifications to the consumers.

FIG. 2 shows as an example with three monitor factories: utilFs.monFactory 210, modFile.monFactory 211, and waitTmCPU.monFactory 212. Each monitor factory (e.g., 210,211,212) will have one or more monitor nodes, each node being an object on which it monitors for an event to happen. These monitor nodes are created by the user application when it registers to be notified of an event.

FIG. 2 shows five monitor nodes: var.mon 221, tmp.mon 222, abc.mon 231, passwd.mon 232, and waitTmCPU.mon 225. Note that, in this exemplary embodiment, the monitor factories are represented as subdirectory nodes and the monitors as files or file nodes under those subdirectories. The filename extension .mon and the directory-name extension .monFactory are given here as sample conventions to use, but other conventions could also be used.

Figure 3:
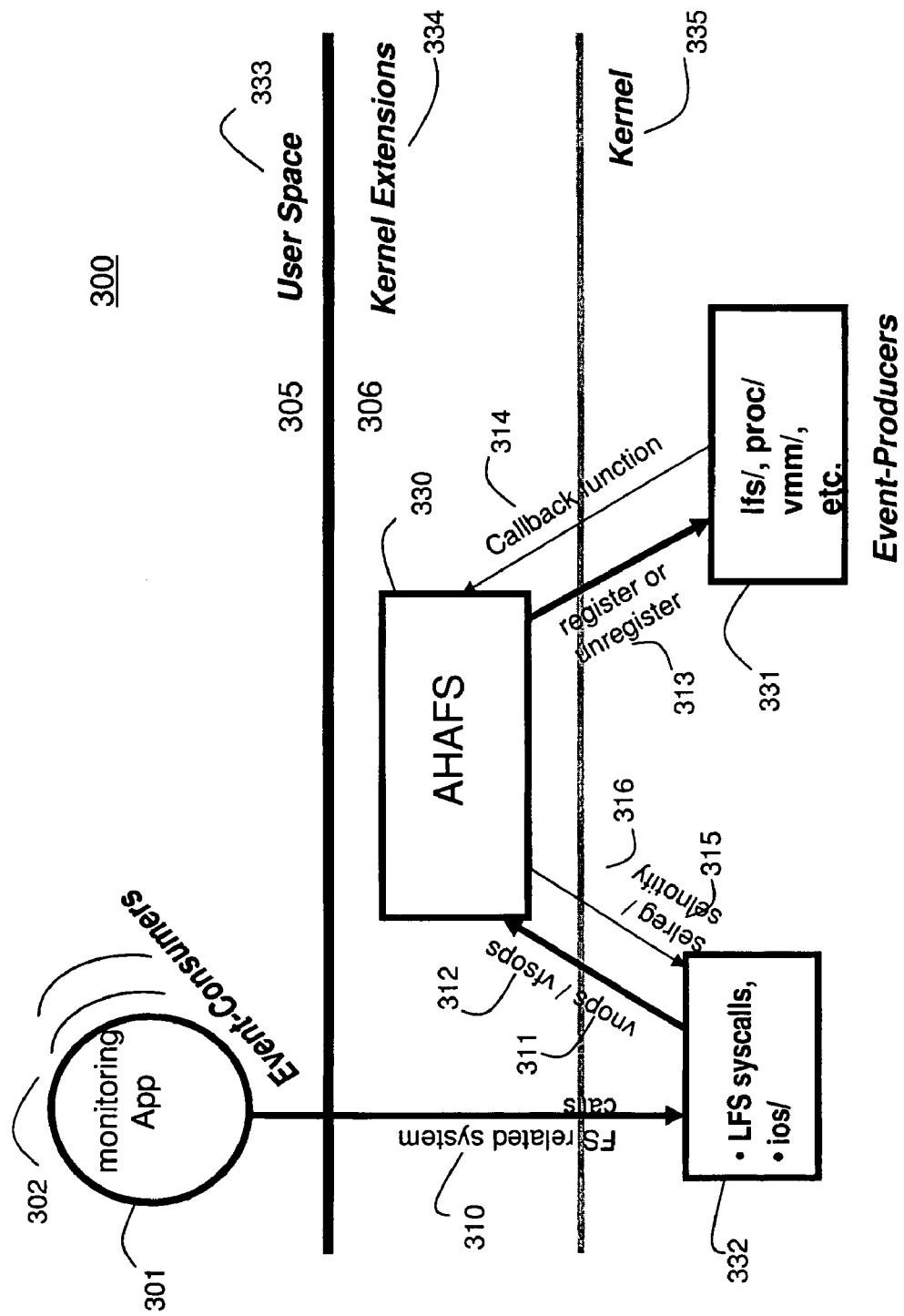
FIG. 3 provides an exemplary schematic 300 demonstrating how the event management filesystem of the present invention presents itself to the end user.

FIG. 3 shows an example implementation of the AHAFS pseudo filesystem in a typical operating system structure that was illustrated in FIG. 1, but getting the event notification via a filesystem interface is not dependent on this specific structure of the OS.

Referring to FIG. 3, the AHAFS framework 300 spans both user and kernel layers 305,306 of the OS. In the user layer 305 reside one or more system management/system monitoring applications 301, 302, ... etc., within user space 333. Within the kernel layer 306, the AHAFS can be implemented either inside the kernel 335 or as a kernel extension 334. It is noted that the terminology "kernel extension" is specific to AIX, which is a UNIX operating system, in which an exemplary embodiment of this invention has been implemented. Other operating systems may have different terminologies for similar concepts. Of course, the present invention is not limited to the UNIX operating system or the exemplary terminologies shown herein, as will be understood by one having ordinary skill in the art, taking the discussion herein as a whole. In the exemplary embodiment shown in FIG. 3, the AHAFS module 330 is shown as installed in the Kernel Extension 334. This location arises from a choice to keep the Kernel 335 to be as small as possible, but there is no reason that the AHAFS module 330 could not alternatively be installed in the Kernel 335.

The event producers reside in any of various subsystems of the kernel 335: Scheduler 111, VMM 112, I/O subsystem 113, Logical Filesystem 114, etc. Thus, each subsystem can contain zero or more event producers. Though it is not discussed in the current embodiment, the event producers can reside in a kernel extension 335 also. When a kernel extension contains an event producer, it informs the availability of that event producer to the kernel when it is initialized.

The monitoring applications 301, 302, ..., in the user space 333 will communicate with the AHAFS module 330 via the standard filesystem interfaces 332 available in the form of system call services 310. The system call services will, in turn, invoke the AHAFS services via virtual node (vnode) operations 311 and virtual filesystem (vfs) operations 312. The order of the invocation of services and the specific service invoked in each stage are given in later figures as exemplary flow charts and described in more detail in the following paragraphs.

The AHAFS module 330 communicates with the Event Producers using a separate registration function for each event producer, determined at the time of initializing the AHAFS module. The event producers communicate with the AHAFS module via callback functions given in the registration functions. The details of what information is exchanged between the AHAFS module and the event producers are specific to each event producer.

Figure 4:
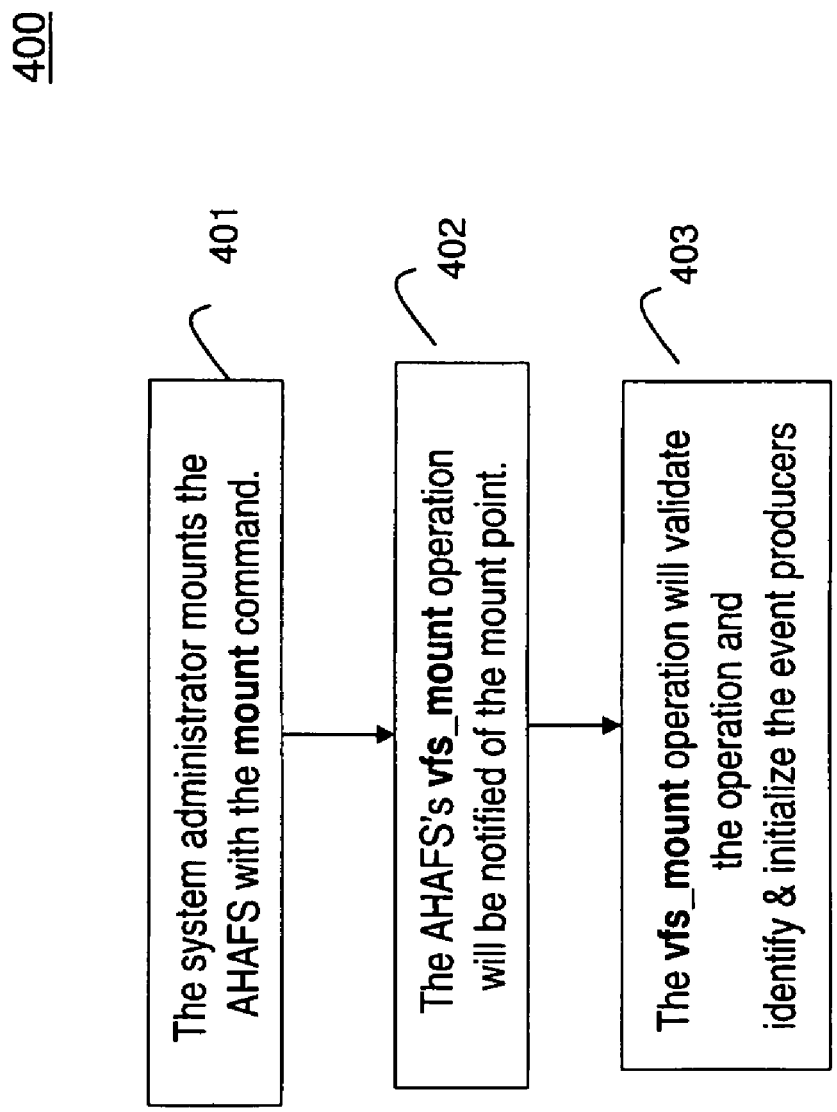
FIG. 4 illustrates an exemplary flowchart 400 of the sequence of actions that occur when the event management filesystem is mounted.

FIG. 4 lists the sequence 400 of steps taken when AHAFS is mounted. The mounting operation initializes the AHAFS module. In step 401, the system administrator invokes the mount command with /aha as the mount point. The mount command informs AHAFS' vmount service in step 402 that a new mount operation has been requested for the AHAFS module.

In step 403, AHAFS' vmount service will check the correctness of the parameters, and performs the initialization of the AHAFS. This initialization involves identifying the event producers in the kernel, allocating memory for the data structures, and setting the function pointers and fields in several data structures. Once the mount operation is successfully completed, the event consumers can use the AHAFS to register for event notifications.

Figure 5:
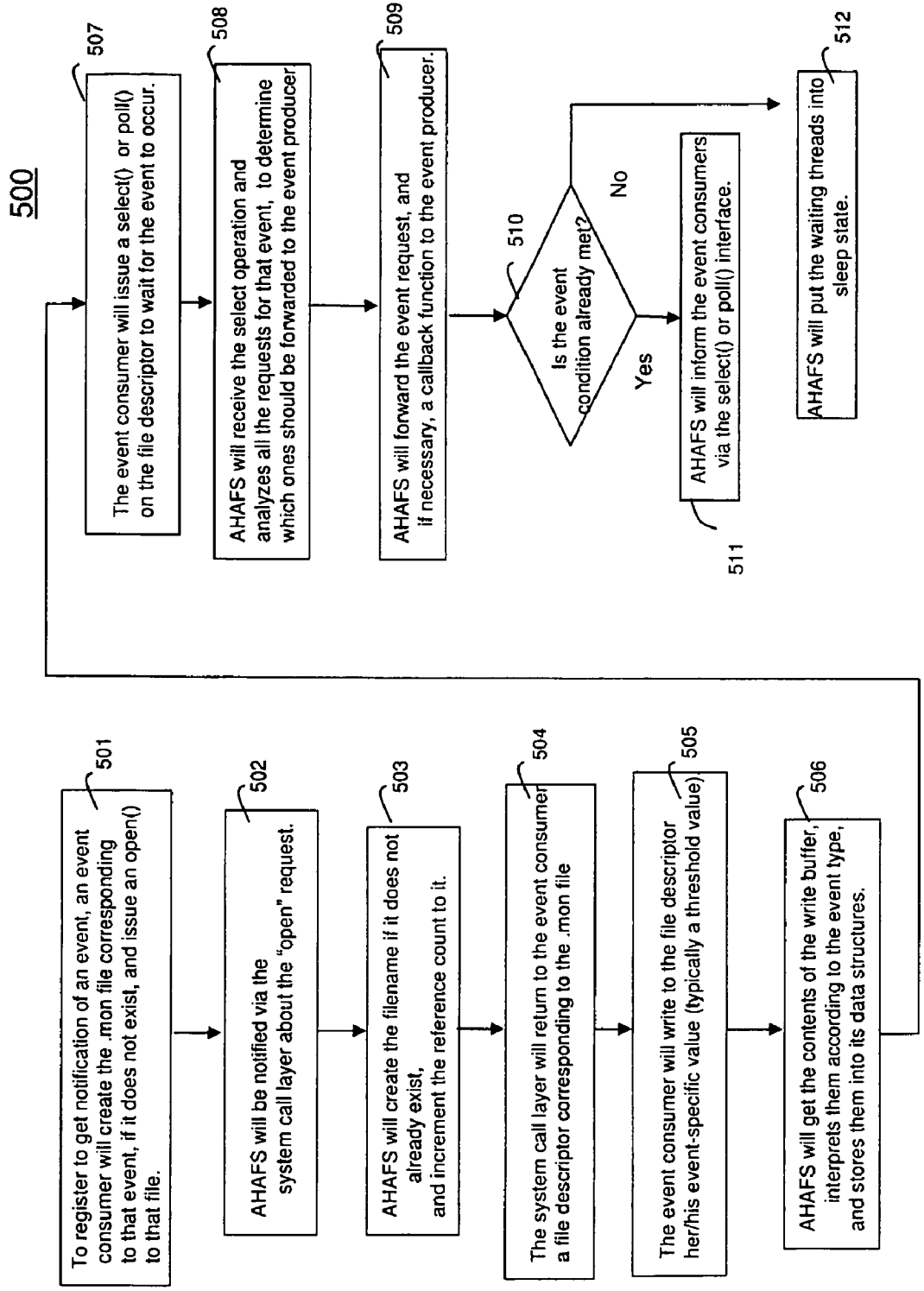
FIG. 5 illustrates an exemplary flowchart 500 of the sequence of actions that occur when an event consumer registers to be notified of an event with the event management filesystem.

FIG. 5 illustrates the sequence 500 of actions taken when an event consumer registers to get notification of an event. As mentioned earlier, the event consumers will use standard filesystem interfaces to register to be notified of an event and to get the event details.

In step 501, a monitoring application registers for an event by issuing an open( ) on the corresponding .mon file.

In step 502, the OS's logical filesystem layer will notify AHAFS about the open request via a vnode operation interface.

In step 503, AHAFS will create the file, if it does not already exist, and increment the reference count.

In step 504, the system call of the logical filesystem will return a file descriptor corresponding to the opened file to the consumer application.

The event consumer then writes an event-specific value into the file using the write( ) system call in step 505. This value can be an integer, floating point, string or a combination, depending on the type of the event.

In step 506, AHAFS gets the contents of the write buffer and interprets the contents according to the event type. For example, if the event is to notify the event consumer whenever a filesystem utilization crosses a threshold, then the value in the write buffer is interpreted as an integer. Once the write buffer is parsed, AHAFS stores the contents into its internal data structures. AHAFS does not pass on the event request to the event producer until the event consumer makes the selects system call.

In step 507, the event consumer calls the selects interface with the file descriptor it received from the previous open( ) call, to inform AHAFS to start monitoring the event.

In step 508, AHAFS receives the selects call and decides whether to forward the event request (step 509) immediately or to keep it in its inventory of event notification requests. AHAFS will not forward the request immediately if it has already sent an event request from another consumer to the event producer. In this exemplary embodiment, at any given point in time, an event producer has at most one event request for a given event instance.

When AHAFS sends an event request to the event producer, it will also pass a callback function address along with the event request, so that, when the event occurs, the event producer can inform AHAFS by invoking the callback function. Some event producers can inform AHAFS if the event condition has already been met, using the return value. If the event condition is already met, then the event consumers will be notified (step 511).

Figure 6:
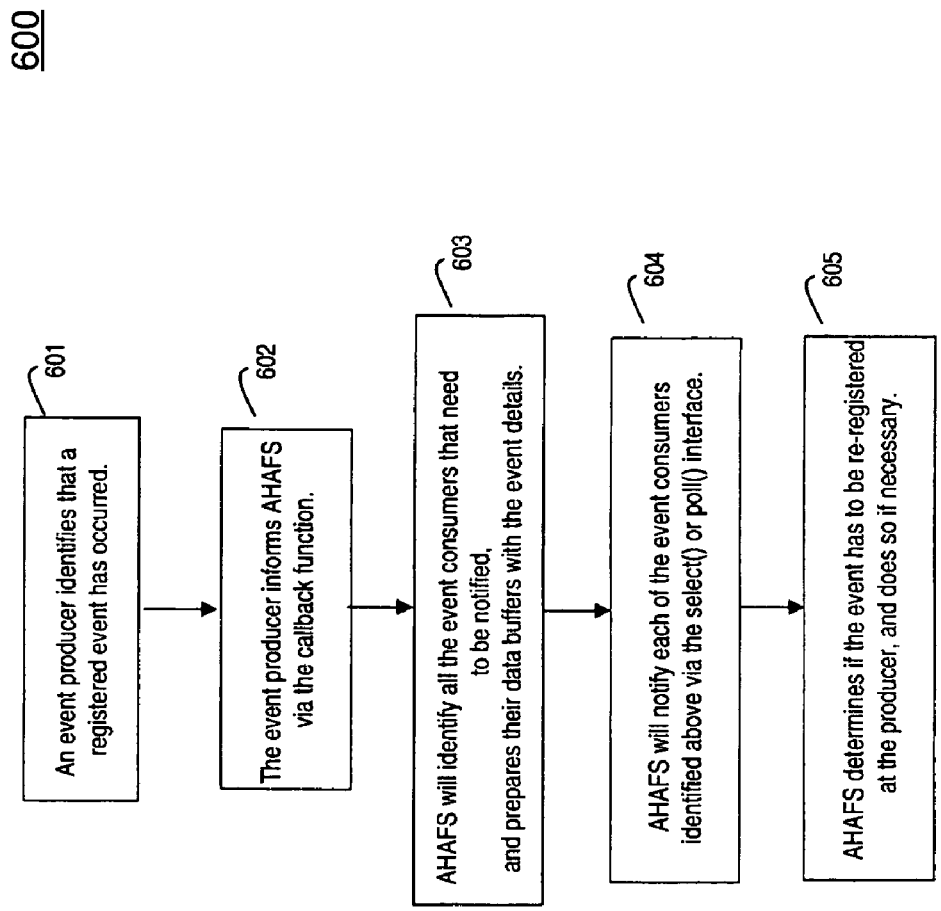
FIG. 6 illustrates an exemplary flowchart 600 of the sequence of actions that take place when an event occurs at the event producer.

FIG. 6 exemplarily lists the sequence 600 of actions that take place when an event occurs at the event producer. In step 601, the event producer identifies that a registered event condition has been met.

In step 602, the event producer informs AHAFS of the event details using the callback function provided earlier.

When AHAFS receives the event details, it identifies the list of event consumers that need to be notified in step 603. Note that there may be more than one event consumer that needs to be notified. AHAFS forwards only one request to the event producer and keeps the remaining consumers in its own queue. Also, depending on the event type, not all event consumers that have registered for an event need to get notification for a given event occurrence.

As an illustration, if the event producer is utilFs (i.e. triggering an event whenever the utilization of a filesystem crosses a consumer-specified threshold) and the current utilization is 90%, then only those event consumers which have registered for thresholds greater than or equal to 90% should be notified. So, when the event producer invokes the callback function, AHAFS will search through its queue to identify all the consumers that need to be notified as a result of this event occurrence (90% full). For each of the identified consumers, AHAFS prepares the data area so that the next read( ) operation by those consumers will provide them with the event's details.

In step 604, AHAFS then notifies each of the identified event consumers.

In step 605, AHAFS checks its queue to see if there are remaining event consumers, and if there are, AHAFS will re-register the event at the event producer.

Figure 7:
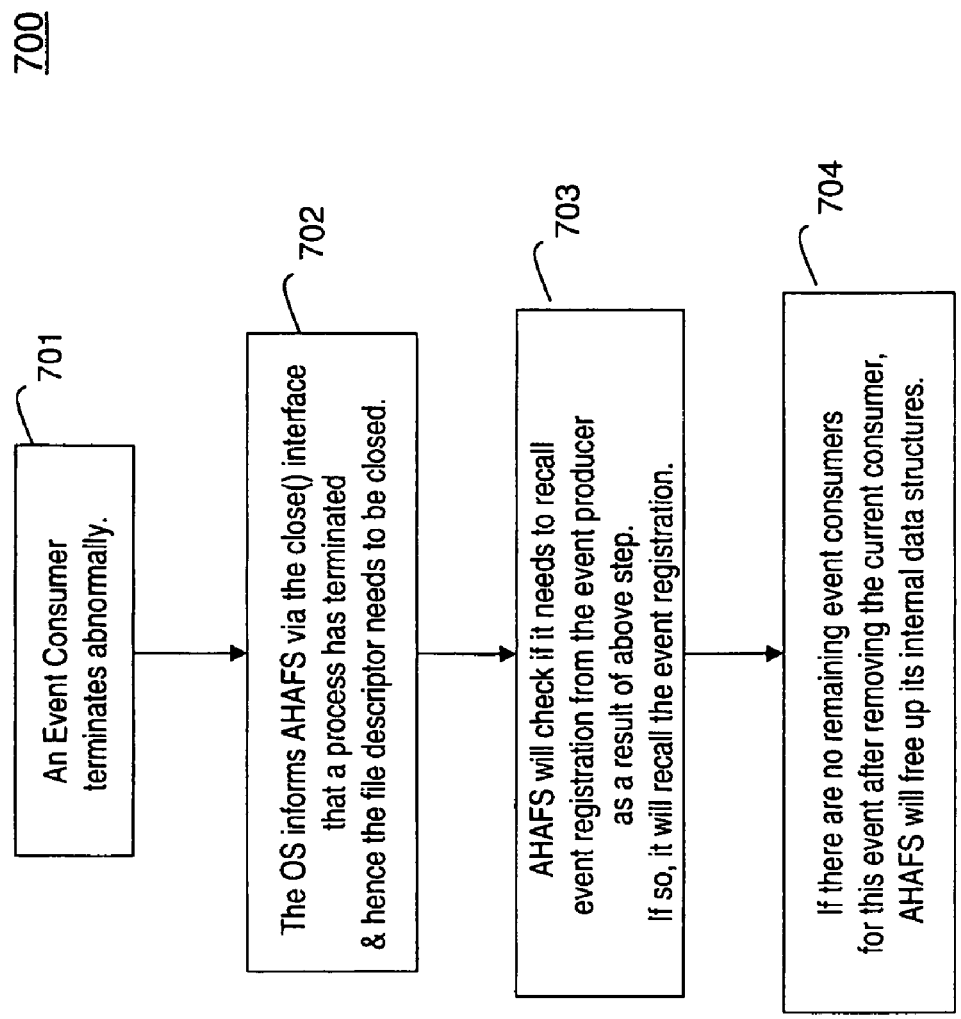
FIG. 7 illustrates an exemplary flowchart 700 of the sequence of actions that take place when an event consumer terminates abnormally.

Another advantage of using filesystem interfaces between the event consumers and AHAFS is that the cleanup is easy in case of abnormal termination of the event consumers, as exemplarily shown in the flowchart 700 of FIG. 7.

When an event consumer terminates abnormally, as shown in step 701, the OS notifies AHAFS via the close( ) vnode operation in step 702 that a file descriptor needs to be closed In step 703, AHAFS will identify the consumer process and will check if this consumer process has an event registration at the event producer. If it has, and if this process is the only event consumer, then AHAFS will recall that registration.

If there are one or more other consumers registered for the event after the current consumer has closed the file descriptor, then AHAFS will re-register the event with the event producer with appropriate parameters.

In step 704, if there are no remaining event consumers for this event after removing the current consumer, then AHAFS will free up its own data areas maintained for the monitor node.

Taking the above descriptions as guidelines, an exemplary embodiment of the present invention might include a method of monitoring an operating system by providing standard filesystem interfaces for event consumers to use for one or more of registering for event notifications of a set of events, receiving an event notification when each event occurs, and getting details of events that have occurred. The embodiment could also include a file tree representation of a list of events available for the event notifications, as illustrated in FIG. 2. The embodiment could also include providing a pseudo filesystem for taking event requests from event consumers and forwarding them to producers, receiving event occurrence information from the event producers, and notifying the event consumers of this information.

The exemplary embodiment could further include providing a registration function and a callback function to the pseudo filesystem from an event producer for event consumers to get notifications when an event occurs.

As shown in the Unix-based example of FIG. 2, the file tree representation could include predetermined naming conventions, to explicitly identify the event producers and event instances, and predetermined special nodes in the tree, to help event consumers identify the file pathname of a specific event instance they are interested in monitoring. The naming conventions could identify event producers by adding a predetermined extension to a directory name and identify event instances by adding a predetermined extension to a filename.

In the Unix-based example, the predetermined directory name extension is ".monFactory" and the predetermined filename extension is ".mon", but other conventions could be used.

In an exemplary embodiment, the standard filesystem interfaces could include one or more of an interface to obtain a handle to a monitor node corresponding to an event instance, an interface to indicate event triggering criteria specific to an event type, an interface to wait until an event occurs, an interface to read an event's specific details after the event has occurred, and an interface to release a handle to the monitor node corresponding to an event instance.

As examples, the interface to obtain a handle to a monitor node corresponding to an event instance could be the open( ) interface, the interface to indicate event triggering criteria specific to an event type could be the write( ) interface, the interface to wait until an event occurs could be the select( ) interface, the interface to read an event's specific details after the event has occurred could be the read ( ) interface, and the interface to release a handle to the monitor node corresponding to an event instance could be the close ( ) interface.

Even though the system has exemplarily been implemented using the file system interfaces exemplary listed above, this listing and examples are not limiting. Other examples of standard file system interfaces might include, for example, poll ( ) instead of select ( ), or ioctl ( ) instead of read( )/write ( ) to achieve the same result. Other file system int The pseudo filesystem could also include one or more of a facility to aggregate multiple event requests from multiple event consumers into one request to the event producer, a mechanism to provide non-destructive reads to the event consumers, and a mechanism to provide a stack trace of a program that caused an event to be triggered.

Exemplary Hardware Implementation

Figure 8:
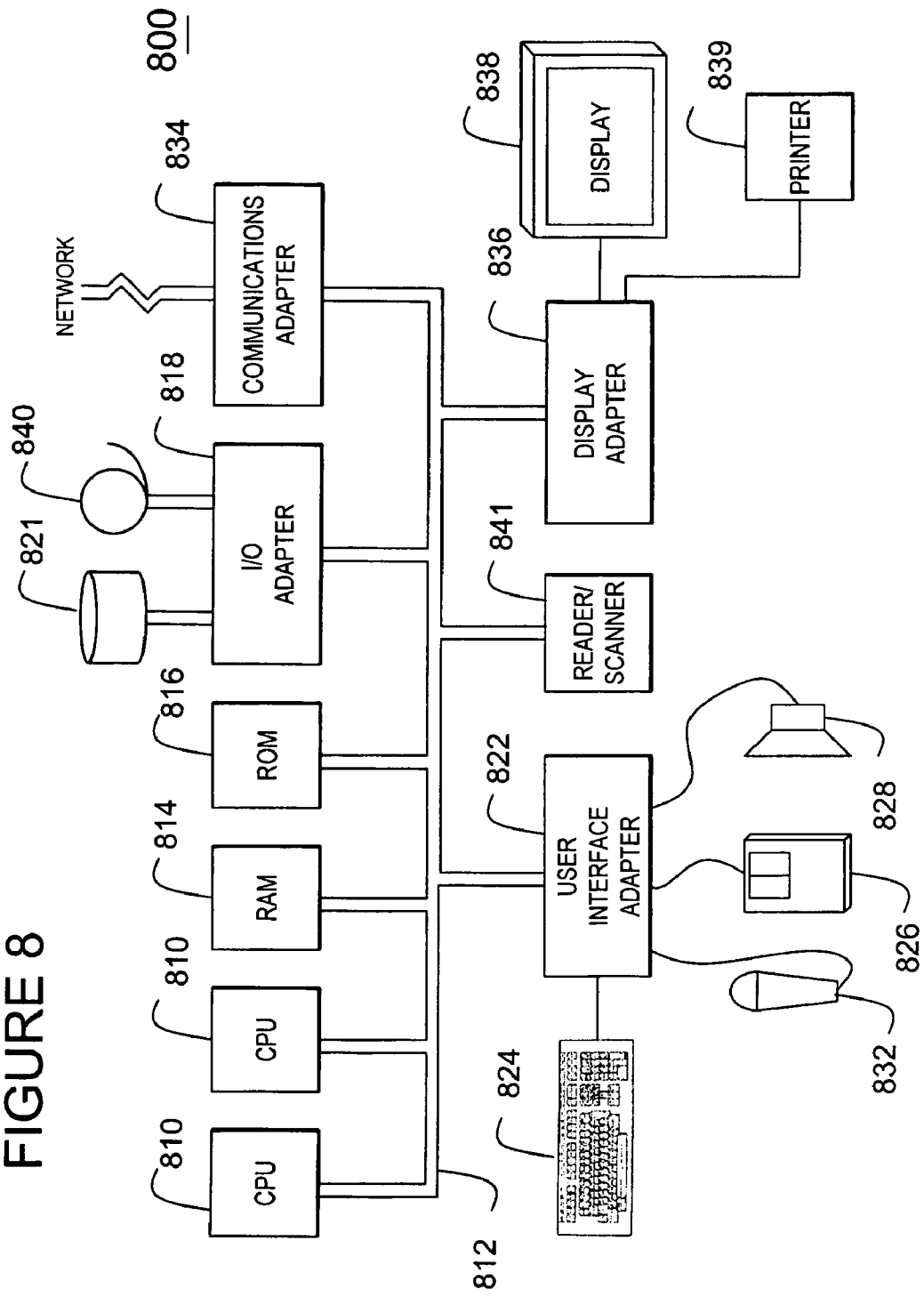
FIG. 8 illustrates an exemplary hardware/information handling system 800 for incorporating the present invention therein.

FIG. 8 illustrates a typical hardware configuration of an information handling/computer system in accordance with the invention and which preferably has at least one processor or central processing unit (CPU) 811. It is noted, however, that, since the present invention is directed to any digital apparatus having an operating system, the present invention is not limited to a computer having the exemplary architecture. Other types of devices might include, for example, such devices as appliances, phones, entertainment devices, etc, that utilize an operating system but might not be considered to be a "computer" such as illustrated in FIG. 8, as is well understood in the art.

The CPUs 811 in FIG. 8 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media or other computer program products, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including storage devices for transmission by digital and analog and communication links and wireless. In an illustrative embodiment of the invention, the machine-readable instructions may comprise software object code.

Exemplary Software Implementation

Figure 10:
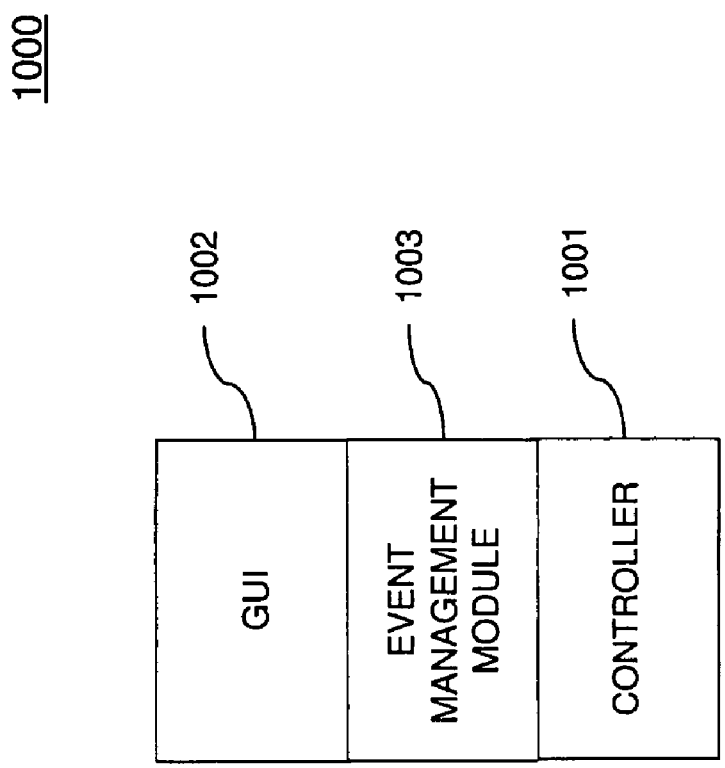
FIG. 10 illustrates an exemplary block diagram 1000 of a software module that could be used to implement the concepts of the present invention.

FIG. 10 shows in block diagram format an exemplary software module 1000 that can be used to implement the methods of the present invention as described above.

The file system part of this invention can be either pre-implemented into the OS or can be added on later after the OS has booted. As mentioned above, currently this invention has been implemented as a kernel extension in the IBM AIX operating system. Kernel extension in AIX is analogous to a dynamically loadable module in other OSs. The event producers part of this invention have to be built into the OS. If there are no event producers available, then adding a file system to expose the OS-events to the applications is of no use.

If not already incorporated into an OS from original development, the present invention has to be implemented for each OS that will be using it. It is noted at this point, that, although the above exemplary description has been restricted to kernel mode event producers, one who is skilled in the art, particularly in operating systems, can easily extend this embodiment to also monitor events occurring in the user space. Therefore, this exemplary embodiment is not intended as limiting the scope of the invention.

However, the invention can also be distributed as a software package that a system administrator can install so that the monitoring applications can use it thereafter. Alternatively, the present invention could be incorporated into debugging tools to provide more sophisticated debugging capabilities to software developers.

FIG. 10 shows an exemplary block diagram 1000 for such administrator's software package or debugging tool. Controller module 1001 would be the main routine of the application program serving the role of an administrator's software/debugging tool and would serve to control the other subroutines. Graphical user interface module 1002 permits the user to input instructions and parameter values, as well as providing interface for displays, including debugging displays for the debugging tool. Event Management module 1003 provides a subroutine to guide the user through the mounting process shown in FIG. 4 that mounts the AHAFS module 330, identify the Event-Producers 331, and use the standard filesystem interfaces 332 shown in FIG. 3 to register interest in events, set thresholds, parameters, etc.

Figure 9:
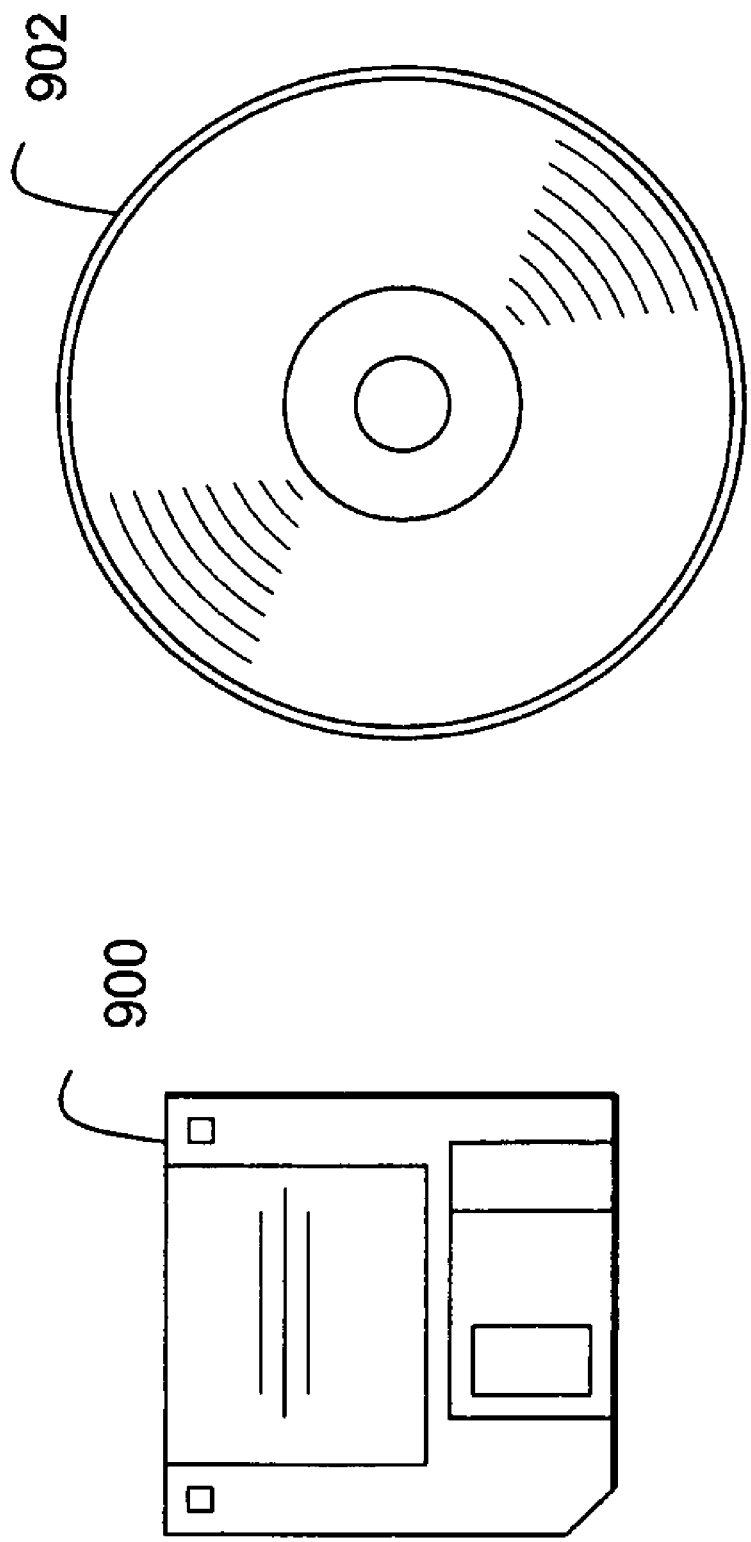
FIG. 9 illustrates a signal bearing medium 900 (e.g., storage medium) for storing steps of a program of a method according to the present invention.

It is noted that the software package exemplarily shown in FIG. 9 is intended as representing software wherein either the entire OS is stored, and the OS has pre-implemented therein the monitoring system of the present invention, or the software contains an administrator's tool so that the present invention can be installed, similar to that shown exemplarily in FIG. 10 in block diagram format 1000.

The Services Aspect

In yet another aspect of the present invention, since the method permits a monitoring of an operating system, or debugging of either the operating system or an application program riding on top of the operating system, or developing software wherein monitoring of the operating system provides a development tool, there is also the opportunity to utilize the present invention as a component in business or providing a service to other entities. Non-limiting examples include, for example, providing an operating system monitoring service on a network, including the potential to intervene in a timely manner, by receiving the event notifications discussed above.

CONCLUSION

From the above description, it should be clear that there are a number of benefits of the present invention (AHAFS). Several exemplary and non-limiting advantages of AHAFS include:

1) Useful info—This invention can provide far more useful information than existing software because AHAFS gets control at the exact point at which an event occurs. For example, for intrusion-detection, besides providing the "who, what, and when" information on an intrusion, AHAFS also provides the "how" information by giving the function-call-stack at the instant of a file modification or a kernel-tunable value-change.

2) Usability—AHAFS is directly usable by any monitoring software that supports fileSystem interfaces, (e.g., open( ), write( ), select( ), read( ), close( ), . . . ). Since most system monitoring software is written in Java, Perl, C, etc, developers can easily use these AHAFS APIs. By avoiding new APIs for AHA, the present invention has avoided the need to extend various runtimes (e.g., add JNI for Java, add other interfaces for Perl, PHP, . . . ). Hence, the present invention has also avoided the need to maintain the new APIs, for every new release of the languages and of Operating Systems.

3) Time-critical events are more effectively monitored via selects filesystem interface rather than periodic monitoring, so that prompt response-actions can be taken before the system is doomed. For example, /var/ filesystem getting full can be handled manually or programatically. Not handling the situation promptly usually leads to system hangs.

4) Low overhead is achieved by using selects call notification, instead of periodic polling by all the users.

5) Flexibility—Multiple consumers can monitor the same event, each with a different threshold value, without linearly increasing the overhead on the OS.

6) Multiple Applications—Moreover, there are multiple applications that can benefit from the present invention. Various systems management applications such as AIX System P Console, IBM Systems Director, IBM Tivoli Monitor, HP OpenView, BMC Patrol, etc. This technology can also be integrated into debugging tools to provide more sophisticated debugging capabilities to software developers.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
a central processing unit (CPU); and
a memory including instructions for an event notification mechanism in an operating system being executed by said CPU, said operating system comprising a kernel and an application layer wherein applications execute in a user mode, said operating system event notification mechanism comprising one or more filesystem interface that is standard for said operating system, for event consumers to use for one or more of:
registering for an event notification;
receiving an event notification when a registered event occurs; and
getting details of an event that has occurred,
wherein said registered events comprise events as detected in said kernel,
wherein said operating system event notification mechanism comprises a file tree representation of a list of events available for said event notification,
wherein said file tree representation comprises:
naming conventions to explicitly identify event producers and event instances; and
nodes in the tree to help an event consumer identify a file pathname of a specific event instance the event consumer is interested in monitoring, and
wherein said naming conventions comprises:
identifying event producers by adding a ".monFactory" extension to a directory name; and
identifying event instances by adding a ".mon" extension to a filename.

2. The apparatus of claim 1, said operating system event notification mechanism further comprising a pseudo filesystem:
taking event requests from event consumers and forwarding said event requests to event producers;
receiving event occurrence information from the event producers; and
notifying one or more of the event consumers of said event occurrence information.

3. The apparatus of claim 2, said operating system event notification mechanism further comprising:
a registration function for registering event producers; and
a callback function to the pseudo filesystem from an event producer for said one or more event consumers to get notifications when an event occurs.

4. The apparatus of claim 1, said filesystem interfaces comprising one or more of:
a first interface to obtain a handle to a monitor node corresponding to an event instance;
a second interface to indicate event triggering criteria specific to an event type;
a third interface to wait until an event occurs;
a fourth interface to read an event's specific details after the event has occurred; and
a fifth interface to release the handle to the monitor node corresponding to the event instance.

5. The apparatus of claim 2, said pseudo filesystem comprising one or more of:
a facility to aggregate multiple event requests from multiple event consumers into one request to an event producer;
a mechanism to provide non-destructive reads to the event consumers; and
a mechanism to provide a stack trace of a program that caused an event to be triggered.

6. The apparatus of claim 1, wherein said registered events comprise events related to a health of said operating system.

7. A method of notifying an operating system event, said operating system comprising a kernel and an application layer wherein applications execute in a user mode, said method comprising:
providing a standard filesystem interface for an event consumer to use for one or more of:
registering for an event notification;
receiving an event notification when each event occurs; and
getting details of an event that has occurred; and providing a file tree representation of a list of events available for event notifications, wherein said registered events comprise events as detected in said kernel, wherein said file tree representation comprises:
predetermined naming conventions to explicitly identify event producers and event instances; and
predetermined special nodes in the tree to help an event consumer identify a file pathname of a specific event instance the event consumer is interested in monitoring, wherein said naming conventions comprises:
identifying event producers by adding a predetermined extension to a directory name; and
identifying event instances by adding a predetermined extension to a filename, and wherein said predetermined directory name extension comprises ".monFactory" and said predetermined filename extension comprises ".mon".

8. The method of claim 7, further comprising providing a pseudo filesystem for:
taking event requests from event consumers and forwarding said event requests to event producers;
receiving event occurrence information from the event producers; and
notifying one or more of the event consumers of said event occurrence information.

9. The method of claim 8, further comprising providing:
a registration function for registering event producers; and
a callback function to the pseudo filesystem from an event producer for said one or more event consumers to get notifications when an event occurs.

10. The method of claim 7, said filesystem interfaces comprising one or more of:
an interface to obtain a handle to a monitor node corresponding to an event instance;
an interface to indicate event triggering criteria specific to an event type;
an interface to wait until an event occurs;
an interface to read an event's specific details after the event has occurred; and
an interface to release the handle to the monitor node corresponding to the event instance.

11. The method of claim 10, wherein said:
interface to obtain a handle to a monitor node corresponding to an event instance comprises an open( ) interface;
interface to indicate event triggering criteria specific to an event type comprises a write ( ) interface;
interface to wait until an event occurs comprises a select ( ) interface;
interface to read an event's specific details after the event has occurred comprises a read ( ) interface; and
interface to release a handle to the monitor node corresponding to an event instance comprises a close ( ) interface.

12. The method of claim 8, said pseudo filesystem comprising one or more of:
a facility to aggregate multiple event requests from multiple event consumers into one request to an event producer;
a mechanism to provide non-destructive reads to the event consumers; and
a mechanism to provide a stack trace of a program that caused an event to be triggered.

13. The method of claim 7, further comprising:
providing event notifications as at least one of an indication of a health of said operating system and an indication in a debugging procedure for said operating system or a program being executed by said operating system.

14. The method of claim 7, further comprising:
mounting said standard filesystem interface onto said operating system.

15. The method of claim 7, said standard filesystem interface derives from a Logical Filesystem (LFS) layer of said operating system.

16. A non-transitory machine-readable storage medium tangibly embodying a program of machine-readable instructions executable by a digital processing apparatus to perform the method of claim 7.

17. The non-transitory machine-readable storage medium of claim 16, comprising one of:
a memory in a digital processing apparatus having an operating system, said memory storing said operating system in preparation for execution by said digital processing apparatus of said operating system, said operating system having incorporated therein said method;
a memory in said digital processing apparatus having said operating system, said memory storing said operating system as said digital processing apparatus is executing said operating system, said operating system having incorporated therein said method;
a memory in a computer on a network, said memory storing said method in order to download said method to another computer connected to said network; and
a computer program product comprising a memory device to be inserted onto a digital processing apparatus for uploading a contents of said memory device onto said digital processing apparatus, a contents of said memory device comprising said method.

\* \* \* \* \*